B. MOORE.
STOVE POT.
APPLICATION FILED JUNE 5, 1911.

1,012,690.

Patented Dec. 26, 1911.

WITNESSES:
W. J. McMillan
E. P. Hall

INVENTOR.
Bertha Moore
BY J. Edward Magbee
ATTORNEY.

UNITED STATES PATENT OFFICE.

BERTHA MOORE, OF GALT, ONTARIO, CANADA.

STOVE-POT.

1,012,690.  Specification of Letters Patent.  Patented Dec. 26, 1911.

Application filed June 5, 1911. Serial No. 631,436.

*To all whom it may concern:*

Be it known that I, BERTHA MOORE, of the town of Galt, in the county of Waterloo and Province of Ontario, Canada, have invented certain new and useful Improvements in Stove-Pots, of which the following is a specification.

The object of my invention is to devise a stove pot in which the bringing of the handles to the position they occupy when the pot is to be lifted or tilted automatically clamps the pot lid in place.

I attain my object by employing two bails pivoted on separate ears each bail after passing through the ear from the outside inwardly having a finger formed thereon adapted when the bails are brought into juxtaposition over the pot to engage the upper surface of the lid and press it down against the pot, substantially as hereinafter more specifically described and illustrated in the accompanying drawings, in which—

Figure 1:
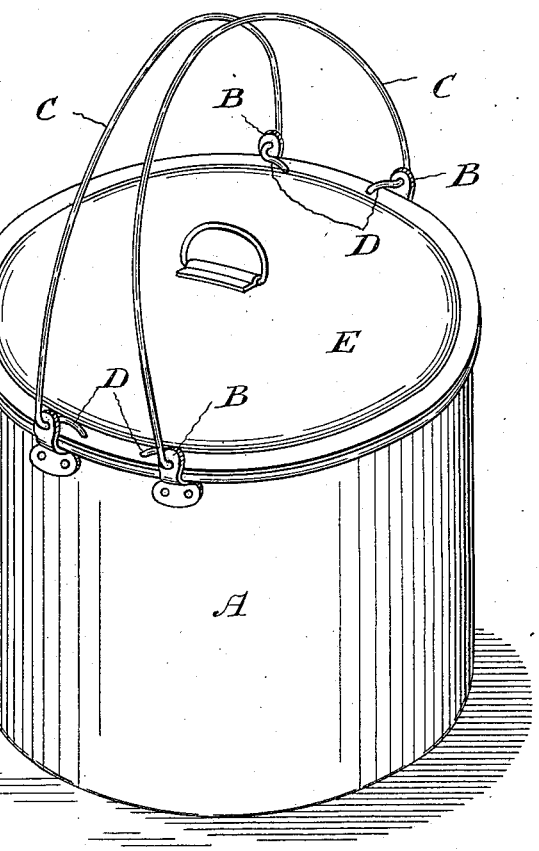
Figure 2:
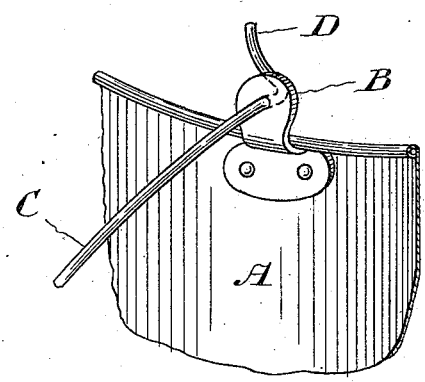

Figure 1 is a perspective view of a pot constructed in accordance with my invention showing the lid clamped in place; and Fig. 2 an enlarged perspective detail of part of a pot and the end of one bail in its lid releasing position.

In the drawings, like letters of reference indicate corresponding parts in the different figures.

The pot A is of any ordinary form and material, but is provided with two pairs of ears B instead of the one pair ordinarily employed. Two bails C forming the handles are employed, each pivoted at its ends in one pair of the ears B. The bails pass through the ears from the outside inward and at each end are bent to form the fingers D. The fingers on one bail are directed inwardly toward the fingers of the other bail so that when the parts are in the position shown in Fig. 1 the lid E is pressed by the fingers D at four points between the ears B. When the fingers engage the lid the bails are in juxtaposition over the pot but are preferably somewhat separated. They are both, therefore, readily grasped by one hand and the strain of the hand upon them will firmly press the fingers D on the lid with a spring pressure due to the resiliency of the bails. Thus not only is the lid securely held in place but the two bails, when so brought together, form a rigid handle with a comparatively wide base of attachment to the pot which enables the pot to be lifted or tilted in any manner desired without any danger of the lid becoming displaced and slipping off. Articles being cooked may thus be drained off without any danger from the escape of steam and without danger of the contents of the pot knocking off the lid and tumbling out. With my pot, vegetables may be drained off safely, using only one hand, whereas with ordinary pots much trouble is experienced when using both hands.

When the bails are turned down, as shown in Fig. 2, the lid E is left free and may easily be removed.

What I claim as my invention is:—

1. A pot provided with two pairs of ears, corresponding ears of each pair being adjacent to each other and on the same side; two bails pivoted in said ears on parallel axes and passing through the ears to the inside; and fingers formed on the ends of the bails adapted to engage a pot lid in four places between the ears when the bails are brought up toward a position in which they may both be grasped and pressed toward one another by one hand.

2. A pot provided with two pairs of ears, corresponding ears of each pair being adjacent to each other and on the same side; two bails pivoted in said ears on parallel axes and passing through the ears to the inside; and fingers formed on the ends of the bails adapted to engage a pot lid in four places, the fingers of each bail being directed inwardly toward the fingers of the other bail when the fingers are in their lid engaging position, and the bails when the fingers are in the aforesaid position being in juxtaposition over the pot but normally slightly separated.

Galt Ont. this 30th day of May 1911.

BERTHA MOORE.

Signed in the presence of—
 M. A. SECORD,
 G. F. STURDY.

Copies of this patent may be obtained for five cents each, by addressing the "Commissioner of Patents, Washington, D. C."